United States Patent
Petit et al.

(10) Patent No.: US 12,132,635 B1
(45) Date of Patent: Oct. 29, 2024

(54) MANAGING A VOLUME OF MISBEHAVIOR REPORTS

(71) Applicant: QUALCOMM Incorporated, San Diego, CA (US)

(72) Inventors: Jonathan Petit, Wenham, MA (US); William Whyte, Natick, MA (US); Mohammad Raashid Ansari, Saugus, MA (US); Cong Chen, San Diego, CA (US); Jean-Philippe Monteuuis, Northborough, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/353,011

(22) Filed: Jul. 14, 2023

(51) Int. Cl.
*H04L 43/16* (2022.01)
*H04L 43/06* (2022.01)
*H04L 67/12* (2022.01)

(52) U.S. Cl.
CPC ............. *H04L 43/16* (2013.01); *H04L 43/06* (2013.01); *H04L 67/12* (2013.01)

(58) Field of Classification Search
CPC .......... H04L 43/06; H04L 43/16; H04L 67/12
See application file for complete search history.

(56) References Cited

U.S. PATENT DOCUMENTS

| | | | | |
|---|---|---|---|---|
| 8,756,430 B2* | 6/2014 | Kherani | ............... | H04L 9/3247 713/168 |
| 9,990,844 B2* | 6/2018 | Park | ............ | G08G 1/017 |
| 10,135,866 B2* | 11/2018 | Choi | ............ | G06F 3/067 |
| 11,178,219 B2* | 11/2021 | Higuchi | ............ | H04W 4/44 |
| 11,407,423 B2* | 8/2022 | Liu | ............ | B60W 30/09 |
| 11,445,362 B2* | 9/2022 | Liu | ............ | H04W 12/069 |
| 11,552,805 B2* | 1/2023 | Kumar | ............ | H04L 67/12 |
| 11,553,346 B2* | 1/2023 | Yang | ............ | H04W 48/02 |
| 11,663,908 B2* | 5/2023 | Petit | ............ | G07C 5/008 340/902 |
| 2011/0238997 A1* | 9/2011 | Bellur | ............ | H04L 9/3242 713/168 |
| 2021/0281986 A1* | 9/2021 | Zhu | ............ | H04L 63/1425 |
| 2022/0014549 A1* | 1/2022 | Yang | ............ | H04L 9/3268 |
| 2022/0095115 A1* | 3/2022 | Shimizu | ............ | H04W 12/104 |
| 2022/0108604 A1* | 4/2022 | Duggal | ............ | G08G 1/0133 |
| 2022/0223033 A1* | 7/2022 | Petit | ............ | G07C 5/0816 |
| 2022/0232383 A1* | 7/2022 | Monteuuis | ............ | H04W 12/088 |
| 2023/0094360 A1* | 3/2023 | Stählin | ............ | H04W 4/40 713/168 |

(Continued)

OTHER PUBLICATIONS

Bouchouia, Mohammed Lamine et al. "A survey on misbehavior detection for connected and autonomous vehicles", publicly posted Mar. 1, 2023, 19 pages. (Year: 2023).*

*Primary Examiner* — George C Neurauter, Jr.
(74) *Attorney, Agent, or Firm* — The Marbury Law Group, PLLC

(57) ABSTRACT

Various embodiments include methods and systems for managing a volume of misbehavior reports. In various embodiments, a vehicle processing system may identify one or more misbehavior observations from among a plurality of misbehavior observations made by the vehicle processing system based on one or more volume management criteria for misbehavior report generation, generate a misbehavior report including information about the identified misbehavior observations, and transmit the generated misbehavior report to a network computing device.

30 Claims, 14 Drawing Sheets

(56) References Cited

U.S. PATENT DOCUMENTS

2023/0336956 A1* 10/2023 Petit .................. H04W 4/023
2024/0013655 A1* 1/2024 Monteuuis ............ H04W 12/12
2024/0020192 A1* 1/2024 Monteuuis .......... H04L 63/1408

* cited by examiner

MANAGING A VOLUME OF MISBEHAVIOR REPORTS

BACKGROUND

Vehicle-to-everything (V2X) systems may be configured to detect inaccurate or intentionally false information in a V2X message received from another vehicle or from a network element of an intelligent transportation system (ITS). Such V2X systems may be configured to detect V2X misbehavior, generate reports of detected V2X misbehavior, and transmit such reports to an appropriate network element. However, generation of misbehavior reports incurs a computational cost as well as a storage cost in each V2X system. Further, transmission of misbehavior reports consumes wireless communication resources and computing resources of the ITS. The generation and transmission of unnecessary misbehavior reports degrades the efficiency and performance of V2X systems and network elements in the ITS.

SUMMARY

Various aspects include methods that may be performed by a vehicle processing system for managing a volume of misbehavior reports. Various aspects may include identifying one or more misbehavior observations from among a plurality of misbehavior observations made by the vehicle processing system based on one or more volume management criteria for misbehavior report generation, generating a misbehavior report including information about the identified misbehavior observations, and transmitting the generated misbehavior report to a network computing device.

In some aspects the volume management criteria may include a predefined time window. In some aspects the volume management criteria may include a predefined time window and one or more additional selection criteria. In some aspects the volume management criteria may include a predefined time window and a criticality weight assigned to each misbehavior observation.

In some aspects identifying one or more misbehavior observations from among the plurality of misbehavior observations made by the vehicle processing system based on one or more volume management criteria for misbehavior report generation may be performed in response to determining that a quantity of misbehavior observations made by the vehicle processing system meets a threshold quantity of misbehavior observations.

In some aspects identifying one or more misbehavior observations from among the plurality of misbehavior observations made by the vehicle processing system based on one or more volume management criteria for misbehavior report generation may include identifying one or more misbehavior observations from among the plurality of misbehavior observations made by the vehicle processing system based on one or more volume management criteria for misbehavior report generation in response to determining that a quantity of misbehavior observations made by the vehicle processing system within a predefined time window meets a threshold quantity of misbehavior observations.

In some aspects identifying one or more misbehavior observations from among the plurality of misbehavior observations made by the vehicle processing system based on one or more volume management criteria for misbehavior report generation may include; identifying one or more misbehavior observations from among the plurality of misbehavior observations made by the vehicle processing system based on one or more volume management criteria for misbehavior report generation in response to determining that a quantity of misbehavior observations made by the vehicle processing system within a predefined time window meets a threshold quantity of misbehavior observations; and selecting misbehavior observations from among the quantity of misbehavior observations made by the vehicle processing system within the predefined time window based on one or more additional selection criteria.

In some aspects: identifying one or more misbehavior observations from among the plurality of misbehavior observations made by the vehicle processing system based on one or more volume management criteria for misbehavior report generation may include grouping two or more misbehavior observations that are related to similar misbehavior operations based on a similarity criterion; and generating the misbehavior report including information about the identified misbehavior observations may include generating one misbehavior report for the similar misbehavior operations.

In some aspects: identifying one or more misbehavior observations from among the plurality of misbehavior observations made by the vehicle processing system based on one or more volume management criteria for misbehavior report generation may include grouping two or more misbehavior observations that are related to a same misbehaving vehicle; and generating the misbehavior report including information about the identified misbehavior observations may include generating one misbehavior report for the two or more misbehavior observations that are related to a same misbehaving vehicle.

Some aspects may further include selecting the one or more volume management criteria for misbehavior report generation based on one or more of a quantity of available memory storage, a processor thermal threshold, available processor cycles or compute resources, or available hardware security module (HSM) cycles or compute resources.

Further aspects include a vehicle processing system including a memory and a processor configured to perform operations of any of the methods summarized above. Further aspects may include a vehicle processing system having various means for performing functions corresponding to any of the methods summarized above. Further aspects may include a non-transitory processor-readable storage medium having stored thereon processor-executable instructions configured to cause a processor of a vehicle processing system to perform various operations corresponding to any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1A:
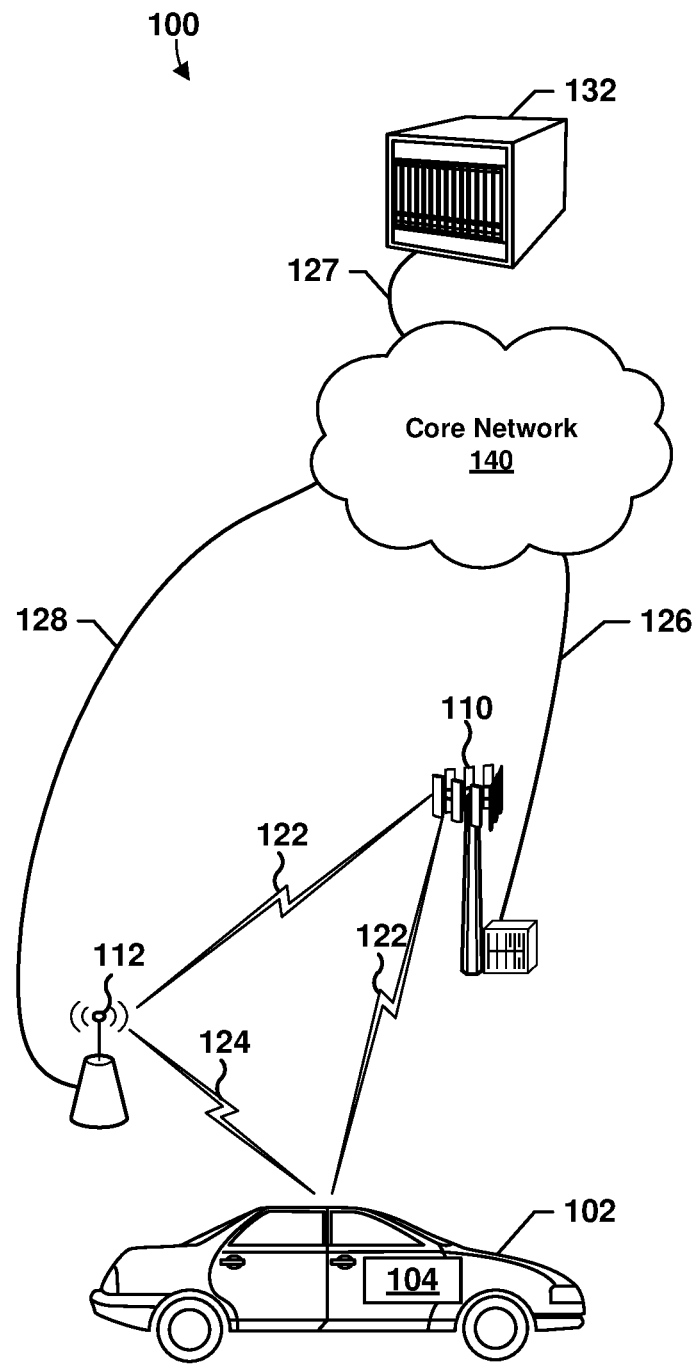
FIG. 1A is a system block diagram illustrating an example communication system suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, and vehicle processing systems implementing the methods, for managing the volume of misbehavior reports that are transmitted by vehicles. In various embodiments, a vehicle processing system may identify one or more misbehavior observations from among a plurality of misbehavior observations made by the vehicle processing system based on one or more volume management criteria for misbehavior report generation. The vehicle processing system may generate a misbehavior report including information about the identified misbehavior observations. The vehicle processing system may transmit the generated misbehavior report to a network computing device.

As used herein, the term "vehicle" refers generally to any of an automobile, motorcycle, truck, bus, train, boat, and any other type of vehicle V2X-capable system that may be configured to manage transmission of misbehavior reports.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

Vehicle processing systems may be configured to detect inaccurate or intentionally false information in a V2X message received from another vehicle or from Intelligent Transportation System (ITS) infrastructure devices, such as Roadside Units (RSUs), gantry units, and other suitable computing devices. Such inaccurate or intentionally false information in a V2X message may be referred to as "V2X misbehavior." A detection by a vehicle processing system of V2X misbehavior may be referred to as a "misbehavior observation." A vehicle processing system may be configured to generate and send reports of such detected inaccurate or intentionally false information, such as misbehavior report, to a Misbehavior Authority ("MA") network computing device, based on one or more misbehavior observations.

However, vehicle processing systems incur a computational cost as well as a storage cost for generating misbehavior reports. A typical misbehavior report may include an identifier of a misbehavior type and one or more V2X messages received by the vehicle processing system flagged as suspicious or evidence of V2X misbehavior. A misbehavior report also may include additional V2X messages, third-party information such as map information related to the location of suspected or detected V2X misbehavior, additional information from the reporting vehicle processing system (e.g., vehicle sensor data), and cryptographic or security information such as a digital signature. Further, transmission of misbehavior reports consumes wireless communication resources and computing resources of the ITS. The generation and transmission of unnecessary misbehavior reports degrades the efficiency and performance of reporting vehicle processing systems as well as of network elements in the ITS.

Various embodiments overcome such limitations by managing transmission of misbehavior reports by enabling a vehicle processing system to manage a volume of misbehavior reports. Various embodiments include methods, and vehicle processing systems implementing the methods, for managing a volume of misbehavior reports. In various embodiments, a vehicle processing system may identify one or more misbehavior observations from among a plurality of misbehavior observations made by the vehicle processing system based on one or more volume management criteria for misbehavior report generation. The vehicle processing system may generate a misbehavior report including information about the identified misbehavior observations. The vehicle processing system may transmit the generated misbehavior report to a network computing device.

In various embodiments, volume management criteria may include one or more elements or aspects of a misbehavior report generation strategy. In some embodiments, the vehicle processing system may select a misbehavior report generation strategy to apply in selecting misbehavior observations. In some embodiments, the vehicle processing system may receive a message or instruction from a network computing device, such as a Misbehavior Authority, specifying a misbehavior report generation strategy for use by the vehicle processing system.

In some embodiments, the volume management criteria may include a predefined time window. In some embodiments, the vehicle processing system may identify one or more misbehavior observations made by the vehicle processing system within the predefined time window from among a plurality of misbehavior observations made within and outside of the predefined time window.

In some embodiments, the volume management criteria may include the predefined time window and one or more additional selection criteria. In such embodiments, the vehicle processing system may select one or more misbehavior observations from among misbehavior observations made within the predefined time window. Such additional selection criteria may include first in-first out (FIFO) and/or last-in-first out (LIFO). In some embodiments, the vehicle processing system may select one or more misbehavior observations at random from among the misbehavior observations made within the predefined time window.

In some embodiments, the vehicle processing system may select one or more misbehavior observations based on available memory storage of the vehicle processing system, such that the selected misbehavior observation(s) do not exceed the available memory storage. In some embodiments, the vehicle processing system may select one or more misbehavior observations based on a thermal threshold of the vehicle processing system (e.g., a thermal threshold of a processor, a system on chip, or another suitable thermal threshold). In some embodiments, the vehicle processing system may select one or more misbehavior observations based on available or unused processor (e.g., CPU) cycles or other compute resources. In some embodiments, the vehicle processing system may select one or more misbehavior observations based on available or unused hardware security module (HSM) cycles or other compute resources. For example, as a number of selected misbehavior observations increases, the computational and memory burdens associated with each misbehavior observation and waste heat generated all may increase due to, for example, processing and storing each behavior observation, identifying and storing related evidence of each observed misbehavior (such as information from received V2X messages and/or vehicle sensor data), encryption of some or all of such information, generating a digital signature, and other suitable operations performed by the vehicle processing system.

In some embodiments, the volume management criteria may include the predefined time window and a criticality weight that the vehicle processing system assigns to each misbehavior observation. In some embodiments, the vehicle processing system may identify the criticality weight for each misbehavior observation based on a data structure such as a lookup table that relates information about the misbehavior observation and the criticality weight. In some embodiments, the vehicle processing system may identify the criticality weight for each misbehavior observation by applying information about each misbehavior observation to a trained machine learning (ML) model and receiving as output from the trained model the criticality weight for each misbehavior observation.

In some embodiments, the vehicle processing system may identify misbehavior observations from among the plurality of misbehavior observations made by the vehicle processing system in response to determining that a quantity of misbehavior observations made by the vehicle processing system meets a threshold quantity of misbehavior observations. In some embodiments, the vehicle processing system may identify misbehavior observations from among the plurality of misbehavior observations made by the vehicle processing system based on one or more volume management criteria for misbehavior report generation in response to determining that a quantity of misbehavior observations made by the vehicle processing system within a predefined time window meets a threshold quantity of misbehavior observations.

In such embodiments, the vehicle processing system may select misbehavior observations from among the quantity of misbehavior observations made by the vehicle processing system within the predefined time window based on one or more additional selection criteria. In some embodiments, such additional selection criteria may include FIFO, LIFO, available memory storage, a thermal threshold, available central processing unit (CPU) cycles or compute resources, available HSM cycles or compute resources, and/or other suitable additional selection criteria.

In some embodiments, the vehicle processing system may group two or more misbehavior observations that are related to similar misbehavior operations based on a similarity criterion. In such embodiments, the vehicle processing system may generate one misbehavior report for the similar misbehavior operations. In some embodiments, the vehicle processing system may generate a misbehavior report that includes information relating to or describing the two or more similar misbehavior observations, related V2X messages received by the vehicle processing system, and other suitable information.

In some embodiments, the vehicle processing system may group two or more misbehavior observations that are related to a same misbehaving vehicle. In such embodiments, the vehicle processing system may generate one misbehavior report for the two or more misbehavior observations that are related to a same misbehaving vehicle. In some embodiments, the vehicle processing system may generate a misbehavior report that includes additional information configured to enable an identification of the misbehaving vehicle, such as sensor data, images or video of the misbehaving vehicle, V2X messages sent by the misbehaving vehicle, and other suitable information.

In some embodiments, the vehicle processing system may select the one or more volume management criteria dynamically. For example, the vehicle processing system may dynamically select the one or more volume management criteria based on available memory storage, a thermal threshold, available CPU cycles or compute resources, available HSM cycles or compute resources, and/or other suitable additional factors. In some embodiments, the vehicle processing system may receive a message or instruction from a network computing device (e.g., the MA, an RSU, a network operator, or another suitable trusted third-party) indicating one or more volume management criteria for use by the vehicle processing system.

Various embodiments improve the efficiency and performance of vehicle processing systems and communication systems by enabling vehicle processing systems to manage a volume of misbehavior reports that a vehicle processing system generates and transmits in a communication network. Various embodiments improve the efficiency and performance of communication systems in which such vehicle processing systems operate by enabling vehicle processing systems to reduce superfluous or similar misbehavior reports, reducing unnecessary consumption of vehicle compute and communication resources, wireless network communication resources, and network processing resources.

FIG. 1A is a system block diagram illustrating an example communication system 100 suitable for implementing various embodiments. The communications system 100 include a 5G New Radio (NR) network, an intelligent transportation system (ITS) V2X wireless network, and/or any other suitable network such as a Long Term Evolution (LTE) network.

References to a 5G network and 5G network elements in the following descriptions are for illustrative purposes and are not intended to be limiting.

The communications system 100 may include a heterogeneous network architecture that includes a core network 140, a number of base stations 110, and a variety of mobile devices including a vehicle 102 equipped with a vehicle processing system 104 (e.g., a V2X processing system or on-board unit) that includes wireless communication capabilities. The base station 110 may communicate with a core network 140 over a wired communication link 126. The communications system 100 also may include roadside units 112 supporting V2X communications with vehicles 102 via V2X wireless communication links 124.

A base station 110 is a network element that communicates with wireless devices (e.g., the vehicle processing system 104 of the vehicle 102) via a wireless communication link 122, and may be referred to as a Node B, an LTE Evolved nodeB (eNodeB or eNB), an access point (AP), a radio head, a transmit receive point (TRP), a New Radio base station (NR BS), a 5G NodeB (NB), a Next Generation NodeB (gNodeB or gNB), or the like. Each base station 110 may provide communication coverage for a particular geographic area or "cell." In 3GPP, the term "cell" can refers to a coverage area of a base station, a base station subsystem serving this coverage area, or a combination thereof, depending on the context in which the term is used. The core network 140 may be any type of core network, such as an LTE core network (e.g., an evolved packet core (EPC) network), 5G core network, a disaggregated network as described with reference to FIG. 1B, etc.

Roadside units 112 may communicate with the core network 140 via a wired or wireless communication link 128. Roadside units 112 may communicate via V2X wireless communication links 124 with vehicle processing system-equipped vehicles 102 for downloading information useful for vehicle processing system autonomous and semi-autonomous driving functions, and for receiving information such as misbehavior reports from the vehicle processing system 104.

A Misbehavior Authority network computing device (MA) 132 may communicate with the core network 140 via a wired or wireless communication link 127. The MA 132 may receive misbehavior reports from the vehicle processing system 104 as may be sent by the vehicle processing system 104 from time to time.

Wireless communication links 122 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Figure 1B:
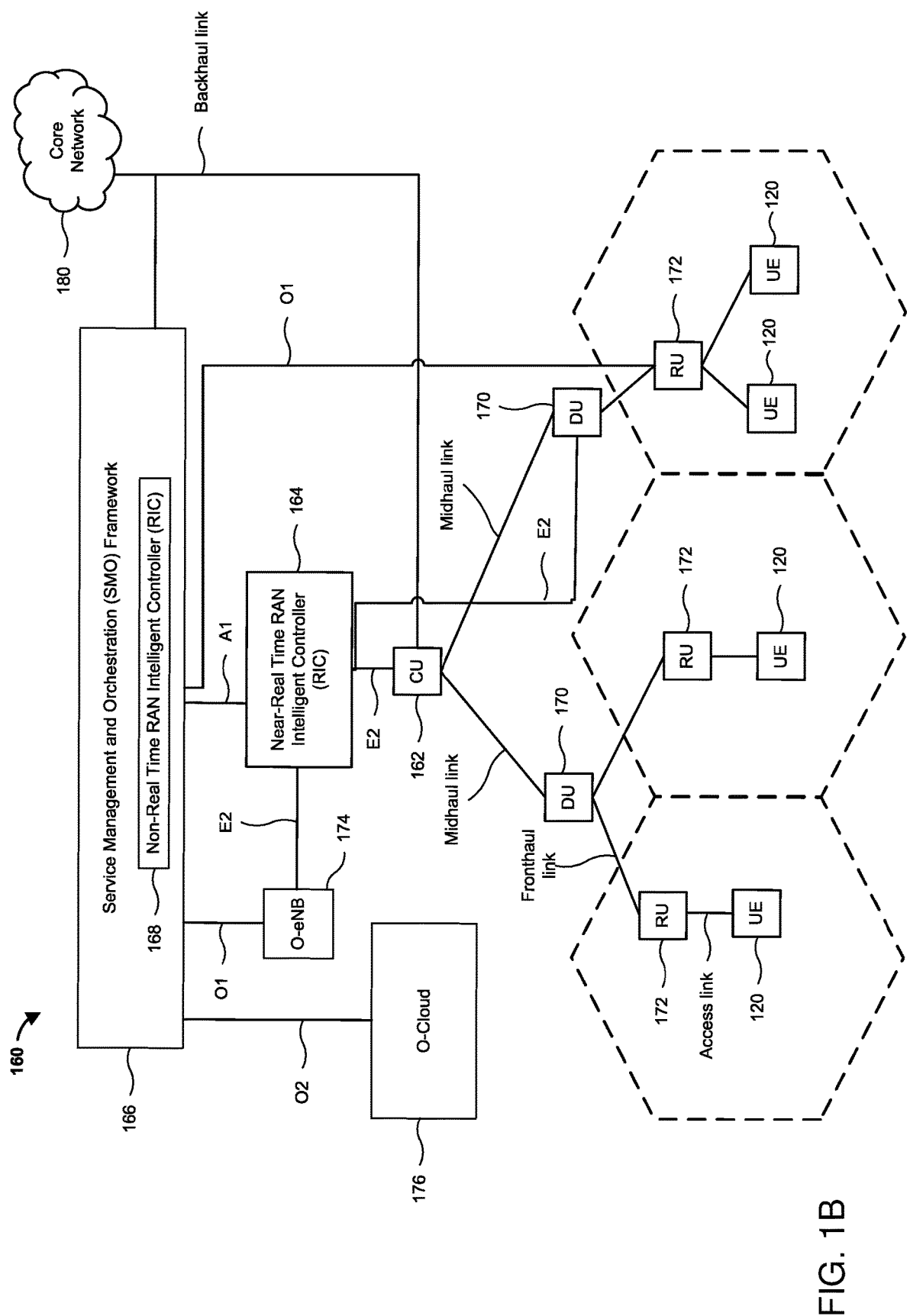
FIG. 1B is a system block diagram illustrating an example disaggregated base station architecture suitable for implementing various embodiments.

FIG. 1B is a system block diagram illustrating an example disaggregated base station 160 architecture that may be part of a V2X and/or 5G network (e.g., the communication system 100) according to any of the various embodiments.

With reference to FIGS. 1A and 1B, the disaggregated base station 160 architecture may include one or more central units (CUs) 162 that can communicate directly with a core network 180 via a backhaul link, or indirectly with the core network 180 through one or more disaggregated base station units, such as a Near-Real Time (Near-RT) RAN Intelligent Controller (RIC) 164 via an E2 link, or a Non-Real Time (Non-RT) RIC 168 associated with a Service Management and Orchestration (SMO) Framework 166, or both. A CU 162 may communicate with one or more distributed units (DUs) 170 via respective midhaul links, such as an F1 interface. The DUs 170 may communicate with one or more radio units (RUS) 172 via respective fronthaul links. The RUs 172 may communicate with respective UEs 120 via one or more radio frequency (RF) access links. In some implementations, user equipment (UE), such as a V2X processing system 104, may be simultaneously served by multiple RUs 172.

Each of the units (i.e., CUs 162, DUs 170, RUs 172), as well as the Near-RT RICs 164, the Non-RT RICs 168 and the SMO Framework 166, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 162 may host one or more higher layer control functions. Such control functions may include the radio resource control (RRC), packet data convergence protocol (PDCP), service data adaptation protocol (SDAP), or the like. Each control function may be implemented with an interface configured to communicate signals with other control functions hosted by the CU 162. The CU 162 may be configured to handle user plane functionality (i.e., Central Unit-User Plane (CU-UP)), control plane functionality (i.e., Central Unit-Control Plane (CU-CP)), or a combination thereof. In some implementations, the CU 162 can be logically split into one or more CU-UP units and one or more CU-CP units. The CU-UP unit can communicate bidirectionally with the CU-CP unit via an interface, such as the E1 interface when implemented in an O-RAN configuration. The CU 162 can be implemented to communicate with DUs 170, as necessary, for network control and signaling.

The DU 170 may correspond to a logical unit that includes one or more base station functions to control the operation of one or more RUs 172. In some aspects, the DU 170 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 170 may further host one or more low PHY layers. Each layer (or module) may be implemented with an interface configured to communicate signals with other layers (and modules) hosted by the DU 170, or with the control functions hosted by the CU 162.

Lower-layer functionality may be implemented by one or more RUs 172. In some deployments, an RU 172, controlled by a DU 170, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 172 may be implemented to handle over the air (OTA) communication with one or more UEs 120. In some implementations, real-time and non-real-time aspects of control and user plane communication with the RU(s) 172 may be controlled by the corresponding DU 170. In some scenarios, this configuration may enable the DU(s) 170 and the CU 162 to be implemented in a cloud-based radio access network (RAN) architecture, such as a vRAN architecture.

The SMO Framework 166 may be configured to support RAN deployment and provisioning of non-virtualized and virtualized network elements. For non-virtualized network elements, the SMO Framework 166 may be configured to support the deployment of dedicated physical resources for RAN coverage requirements, which may be managed via an operations and maintenance interface (such as an O1 interface). For virtualized network elements, the SMO Framework 166 may be configured to interact with a cloud computing platform (such as an open cloud (O-Cloud) 176) to perform network element life cycle management (such as to instantiate virtualized network elements) via a cloud computing platform interface (such as an O2 interface). Such virtualized network elements can include, but are not limited to, CUs 162, DUs 170, RUs 172 and Near-RT RICs 164. In some implementations, the SMO Framework 166 may communicate with a hardware aspect of a 4G RAN, such as an open eNB (O-eNB) 174, via an O1 interface. Additionally, in some implementations, the SMO Framework 166 may communicate directly with one or more RUs 172 via an O1 interface. The SMO Framework 166 also may include a Non-RT RIC 168 configured to support functionality of the SMO Framework 166.

The Non-RT RIC 168 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 164. The Non-RT RIC 168 may be coupled to or communicate with (such as via an A1 interface) the Near-RT RIC 164. The Near-RT RIC 164 may be configured to include a logical function that enables near-real-time control and optimization of RAN elements and resources via data collection and actions over an interface (such as via an E2 interface) connecting one or more CUs 162, one or more DUs 170, or both, as well as an O-eNB, with the Near-RT RIC 164.

In some implementations, to generate AI/ML models to be deployed in the Near-RT RIC 164, the Non-RT RIC 168 may receive parameters or external enrichment information from external servers. Such information may be utilized by the Near-RT RIC 164 and may be received at the SMO Framework 166 or the Non-RT RIC 168 from non-network data sources or from network functions. In some examples, the Non-RT RIC 168 or the Near-RT RIC 164 may be configured to tune RAN behavior or performance. For example, the Non-RT RIC 168 may monitor long-term trends and patterns for performance and employ AI/ML models to perform corrective actions through the SMO Framework 166 (such as reconfiguration via 01) or via creation of RAN management policies (such as A1 policies).

Figure 1C:
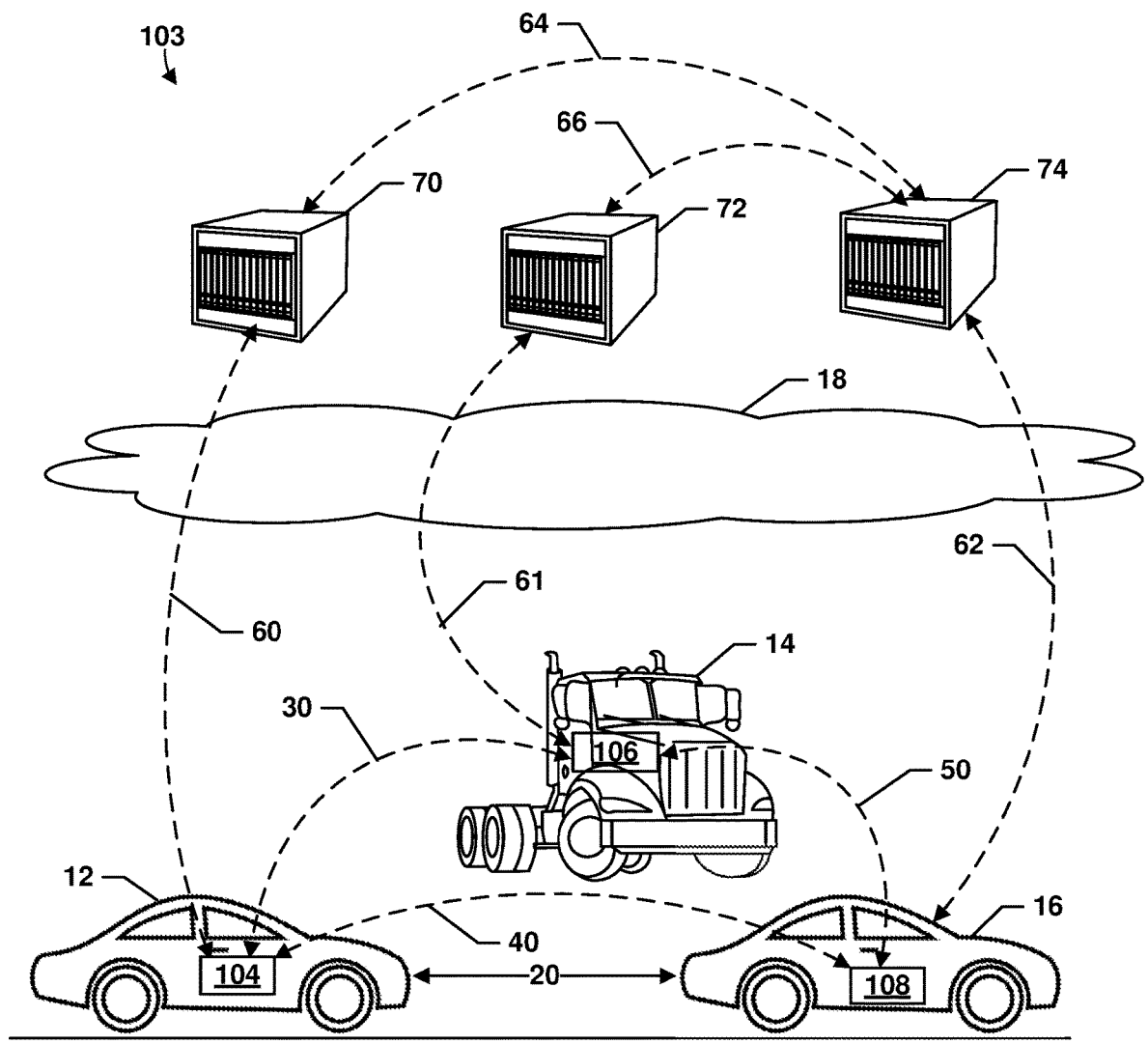
FIG. 1C is a system block diagram illustrating a communication system suitable for implementing various embodiments.

FIG. 1C is a system block diagram illustrating a communication system 103 suitable for implementing various embodiments. With reference to FIGS. 1A-1C, the communication system 103 may include three vehicles 12, 14, 16. Each vehicle 12, 14, 16 may include a vehicle processing system 104, 106, 108, respectively, each configured to periodically broadcast V2X messages 30, 40, 50 such as BSM, CAM, MCM, MAP, SRM, and other types of V2X messages for receipt and processing by other vehicles' V2X processing systems (e.g., 104, 106, 108).

By sharing the vehicle location, speed, direction, braking, and other information, vehicles can maintain safe separation and identify and avoid potential collisions. For example, a trailing vehicle 12 receiving V2X messages 40 from a leading vehicle 16 can determine the speed and location of the vehicle 16, which in turn enables vehicle 12 to match the speed and maintain a safe separation distance 20.

By being informed through V2X messages 40 when the leading vehicles 16 applies the brakes, the vehicle processing system 104 in the trailing vehicle 12 can apply brakes simultaneously to maintain the safe separation distance 20 even when the leading vehicle 16 stops suddenly. As another example, the vehicle processing system 106 within the truck vehicle 14 may receive V2X messages 30, 50 from the two vehicles 12, 16, and thus be informed that the truck vehicle 14 should stop at the intersection to avoid a collision.

Each of the vehicle processing systems 104, 106, 108 may communicate with one another using any of a variety close proximity communication protocols. In addition, the vehicles may be able to transmit data and information regarding detected V2X messages as well as a misbehavior report about detected V2X misbehavior to an original equipment manufacturer (OEM) (70, 72) and/or MA 74 (e.g., 132) via communication links 60, 61, 62 through a communication network 18. The misbehavior report may be transmitted to the MA 74, e.g., via communication link 64, 66.

In some embodiments, the misbehavior report may first be transmitted to a misbehavior report pre-processing unit such as the OEM servers 70, 72 for pre-processing through communication links 64, 66. Then the pre-processed misbehavior report may be transmitted from the misbehavior report pre-processing servers 70, 72 to the MA 74 through communication links 64, 66.

In some embodiments, a misbehavior report may be received from a vehicle, such as from vehicle 16, at the MA 74. The MA 74 may relay the received misbehavior report from the vehicle 16 onto OEM servers 70, 72 via communication links 64, 66. In addition, the OEM servers 70, 72 may provide confirmation reports to the MA 74 via communication links 64, 66.

Figure 2:
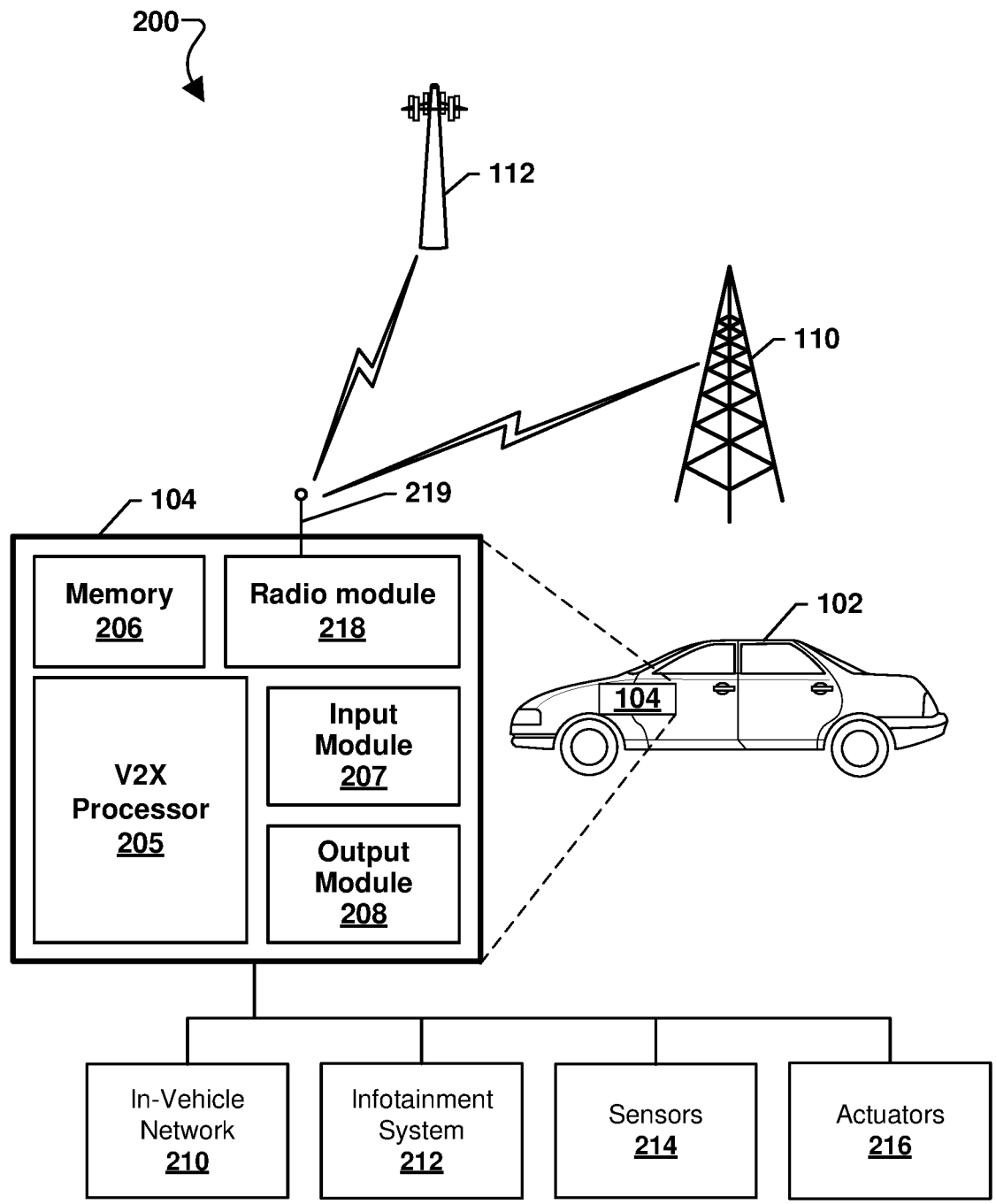
FIG. 2 is a component diagram of an example vehicle processing system suitable for implementing various embodiments.

FIG. 2 is a component diagram of an example vehicle processing system 200 suitable for implementing various embodiments. With reference to FIGS. 1A-2, the processing system 200 may include the vehicle 102 that includes the vehicle processing system 104. The vehicle processing system 104 may communicate with various systems and devices, such as an in-vehicle network 210, an infotainment system 212, various sensors 214, various actuators 216, and a radio module 218 coupled to an antenna 219. The vehicle processing system 104 also may communicate with roadside units 112, cellular communication network base stations 110, and other external devices.

The vehicle processing system 104 may include a processor 205, memory 206, an input module 207, an output module 208, and the radio module 218. The processor 205 may be coupled to the memory 206 (i.e., a non-transitory storage medium), and may be configured with processor-executable instructions stored in the memory 206 to perform operations of the methods according to various embodiments described herein. Also, the processor 205 may be coupled to the output module 208, which may control in-vehicle displays, and to the input module 207 to receive information from vehicle sensors as well as driver inputs.

The vehicle processing system 104 may include a V2X antenna 219 coupled to the radio module 218 that is configured to communicate with one or more ITS participants (e.g., stations), a roadside unit 112, and a base station 110 or another suitable network access point. The V2X antenna 219 and radio module 218 may be configured to receive dynamic traffic flow feature information via vehicle-to-everything (V2X) communications. In various embodiments, the vehicle processing system 104 may receive information from a plurality of information sources, such as the in-vehicle network 210, infotainment system 212, various sensors 214, various actuators 216, and the radio module 218. The vehicle processing system 104 may be configured to perform autonomous or semi-autonomous driving functions using map data in addition to sensor data.

Examples of an in-vehicle network 210 include a Controller Area Network (CAN), a Local Interconnect Network (LIN), a network using the FlexRay protocol, a Media Oriented Systems Transport (MOST) network, and an Automotive Ethernet network. Examples of vehicle sensors 214 include a location determining system (such as a Global Navigation Satellite Systems (GNSS) system, a camera, radar, lidar, ultrasonic sensors, infrared sensors, and other suitable sensor devices and systems. Examples of vehicle actuators 216 include various physical control systems such as for steering, brakes, engine operation, lights, directional signals, and the like.

Figure 3:
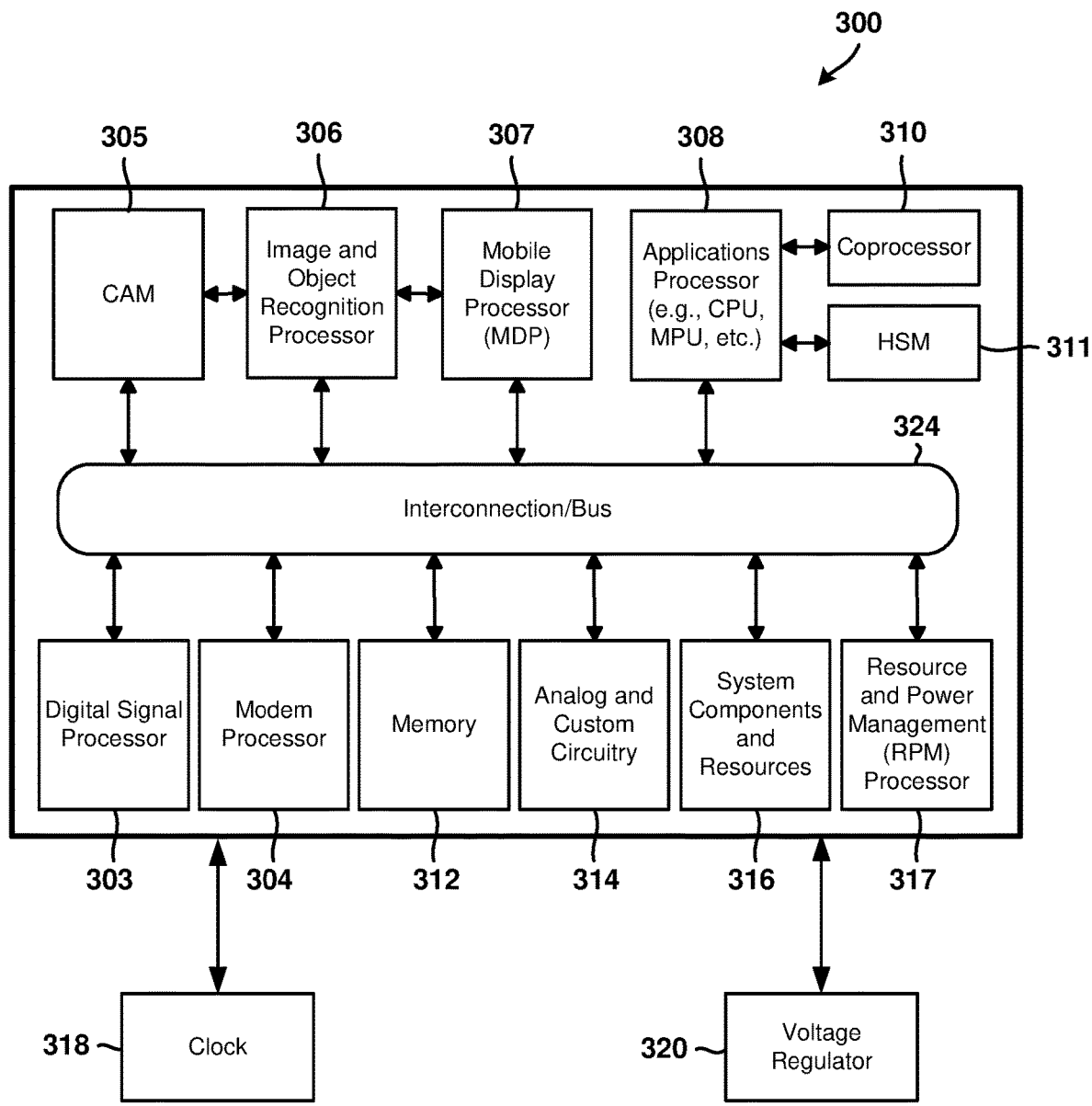
FIG. 3 is a block diagram illustrating an example components of a system on chip (SOC) for use in a vehicle processing system in accordance with various embodiments.

FIG. 3 is a block diagram illustrating an example components of a system on chip (SOC) 300 for use in a vehicle processing system in accordance with various embodiments. With reference to FIGS. 1A-3, the processing device SOC 300 may include a number of heterogeneous processors, such as a digital signal processor (DSP) 303, a modem processor 304, an image and object recognition processor 306, a mobile display processor 307, an applications processor 308, and a resource and power management (RPM) processor 317. The processing device SOC 300 may also include one or more coprocessors 310 (e.g., vector co-processor) connected to one or more of the heterogeneous processors 303, 304, 306, 307, 308, 317. The processing device SOC 300 also may also include a hardware security module (HSM) 311 configured to perform one or more security operations for V2X communications.

Each of the processors may include one or more cores, and an independent/internal clock. Each processor/core may perform operations independent of the other processors/cores. For example, the processing device SOC 300 may include a processor that executes a first type of operating system (e.g., FreeBSD, LINUX, OS X, etc.) and a processor that executes a second type of operating system (e.g., Microsoft Windows). In some embodiments, the applications processor 308 may be the SOC's 300 main processor, central processing unit (CPU), microprocessor unit (MPU), arithmetic logic unit (ALU), etc. The graphics processor 306 may be graphics processing unit (GPU).

The processing device SOC 300 may include analog circuitry and custom circuitry 314 for managing sensor data, analog-to-digital conversions, wireless data transmissions, and for performing other specialized operations, such as processing encoded audio and video signals for rendering in a web browser. The processing device SOC 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 300 also include specialized circuitry for camera actuation and management (CAM) 305 that includes, provides, controls and/or manages the operations of one or more cameras (e.g., a primary camera, webcam, 3D camera, etc.), the video display data from camera firmware, image processing, video preprocessing, video front-end (VFE), in-line JPEG, high definition video codec, etc. The CAM 305 may be an independent processing unit and/or include an independent or internal clock.

In some embodiments, the image and object recognition processor 306 may be configured with processor-executable instructions and/or specialized hardware configured to perform image processing and object recognition analyses involved in various embodiments. For example, the image and object recognition processor 306 may be configured to perform the operations of processing images received from cameras via the CAM 305 to recognize and/or identify other vehicles, and otherwise perform functions of the camera perception layer 224 as described. In some embodiments, the processor 306 may be configured to process radar or lidar data and perform functions of the radar and/or lidar perception layer 222 as described.

The system components and resources 316, analog and custom circuitry 314, and/or CAM 305 may include circuitry to interface with peripheral devices, such as cameras, radar, lidar, electronic displays, wireless communication devices, external memory chips, etc. The processors 303, 304, 306, 307, 308 may be interconnected to one or more memory elements 312, system components and resources 316, analog and custom circuitry 314, CAM 305, RPM processor, 317, and HSM 311 via an interconnection/bus module 324, which may include an array of reconfigurable logic gates and/or implement a bus architecture (e.g., CoreConnect, AMBA, etc.). Communications may be provided by advanced interconnects, such as high-performance networks-on chip (NoCs).

The processing device SOC 300 may further include an input/output module (not illustrated) for communicating with resources external to the SOC, such as a clock 318 and a voltage regulator 320. Resources external to the SOC (e.g., clock 318, voltage regulator 320) may be shared by two or more of the internal SOC processors/cores (e.g., a DSP 303, a modem processor 304, a graphics processor 306, an applications processor 308, etc.).

In some embodiments, the processing device SOC 300 may be included in a control unit (e.g., 140) for use in a vehicle (e.g., 100). The control unit may include communication links for communication with a telephone network (e.g., 180), the Internet, and/or a network server (e.g., 184) as described.

The processing device SOC 300 may also include additional hardware and/or software components that are suitable for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, GNSS receivers, communications circuitry (e.g., Bluetooth®, WLAN, WiFi, etc.), and other well-known components of modern electronic devices.

Figure 4:
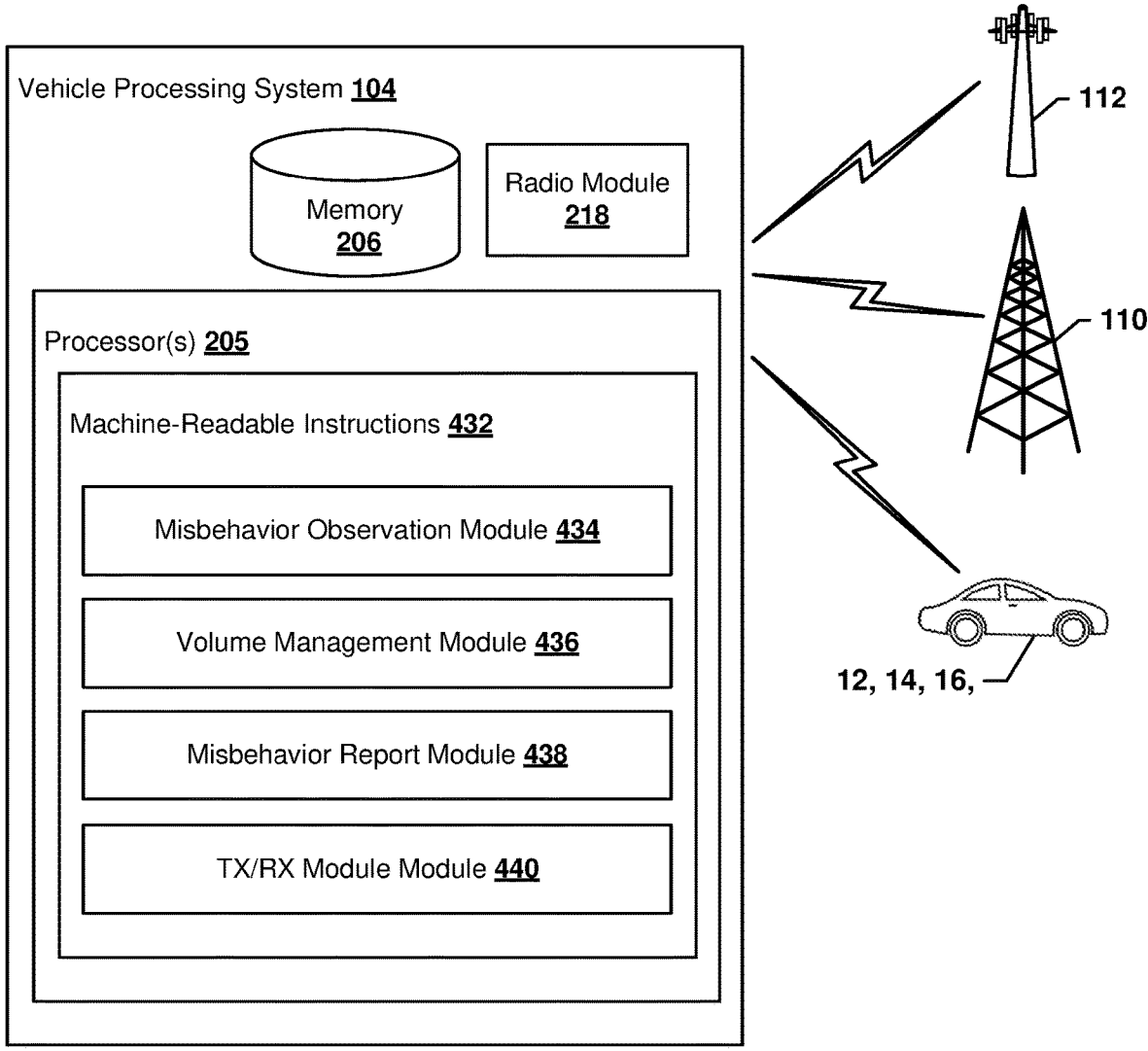
FIG. 4 is a component block diagram illustrating elements of a vehicle processing system configured in accordance with various embodiments.

FIG. 4 is a component block diagram illustrating elements of a vehicle processing system 104 configured in accordance with various embodiments. With reference to FIGS. 1A-4, the vehicle processing system 104 of a vehicle (e.g., 102) may be configured to communicate with a roadside unit 112, a cellular network base station 110, and/or one or more other vehicles 12, 14, 16.

The vehicle processing system 104 may include one or more processors 205, memory 206, a radio module 218, and other components. The vehicle processing system 104 may include a plurality of hardware, software, and/or firmware components operating together to provide the functionality attributed herein to the processor 205.

The memory 206 may include non-transitory storage media that electronically stores information. The electronic storage media of memory 206 may include one or both of system storage that is provided integrally (i.e., substantially non-removable) with the vehicle processing system 104 and/or removable storage that is removably connectable to the vehicle processing system 104 via, for example, a port (e.g., a universal serial bus (USB) port, a firewire port, etc.) or a drive (e.g., a disk drive, etc.). In various embodiments, memory 206 may include one or more of electrical charge-based storage media (e.g., EEPROM, RAM, etc.), solid-state storage media (e.g., flash drive, etc.), optically readable storage media (e.g., optical disks, etc.), magnetically readable storage media (e.g., magnetic tape, magnetic hard drive, floppy drive, etc.), and/or other electronically readable storage media.

The memory 206 may include one or more virtual storage resources (e.g., cloud storage, a virtual private network, and/or other virtual storage resources). Memory 206 may store software algorithms, information determined by processor(s) 205, information received from the one or more other vehicles 12, 14, 16, information received from the roadside unit 112, information received from the base station 110, and/or other information that enables the vehicle processing system 104 to function as described herein.

The processor(s) 205 may include one of more local processors that may be configured to provide information processing capabilities in the vehicle processing system 104. As such, the processor(s) 205 may include one or more of a digital processor, an analog processor, a digital circuit designed to process information, an analog circuit designed to process information, a state machine, and/or other mechanisms for electronically processing information. Although the processor(s) 205 is shown in FIG. 3B as a single entity, this is for illustrative purposes only. In some embodiments, the processor(s) 205 may include a plurality of processing units. These processing units may be physically located within the same device, or the processor(s) 205 may represent processing functionality of a plurality of devices distributed in the vehicle and operating in coordination.

The vehicle processing system 104 may be configured by machine-readable instructions 432, which may include one or more instruction modules. The instruction modules may include computer program modules. In various embodiments, the instruction modules may include at least one or more of a misbehavior observation module 434, a volume management module 436, a misbehavior report module 438, and a transmit/receive (TX/RX) module 440.

The misbehavior observation module 434 may be configured to identify one or more misbehavior observations from among a plurality of misbehavior observations made by the vehicle processing system based on one or more volume management criteria for misbehavior report generation.

The volume management module 436 may be configured to provide or apply one or more volume management criteria for identifying the one or more misbehavior observations. The volume management module 436 may be configured to select the one or more volume management criteria for misbehavior report generation based on one or more selection criteria, which may include a quantity of available memory storage, a processor thermal threshold, available processor cycles or compute resources, or available hardware security module (HSM) cycles or compute resources.

The misbehavior report module 438 may be configured to generate a misbehavior report including information about the identified misbehavior observations.

The TX/RX module 440 may be configured to transmit a generated misbehavior report to a network computing device. The TX/RX module 440 may be configured to control and/or handle other aspects of wireless communication of the vehicle processing system 104, such as receiving one or more V2X messages from the one or more other vehicles 12, 14, 16, the roadside unit 112, and/or the base station 110. The TX/RX module 440 may be configured to control the operations of communication devices of the vehicle processing system such as the radio module 218.

The processor(s) 205 may be configured to execute the modules 432-344 and/or other modules by software, hardware, firmware, some combination of software, hardware, and/or firmware, and/or other mechanisms for configuring processing capabilities on processor(s) 205.

The description of the functionality provided by the different modules 434-440 is for illustrative purposes, and is not intended to be limiting, as any of modules 434-440 may provide more or less functionality than is described. For example, one or more of modules 434-440 may be eliminated, and some or all of its functionality may be provided by other ones of modules 434-440. As another example, processor(s) 205 may be configured to execute one or more additional modules that may perform some or all of the functionality attributed below to one of modules 434-440.

Figure 5A:
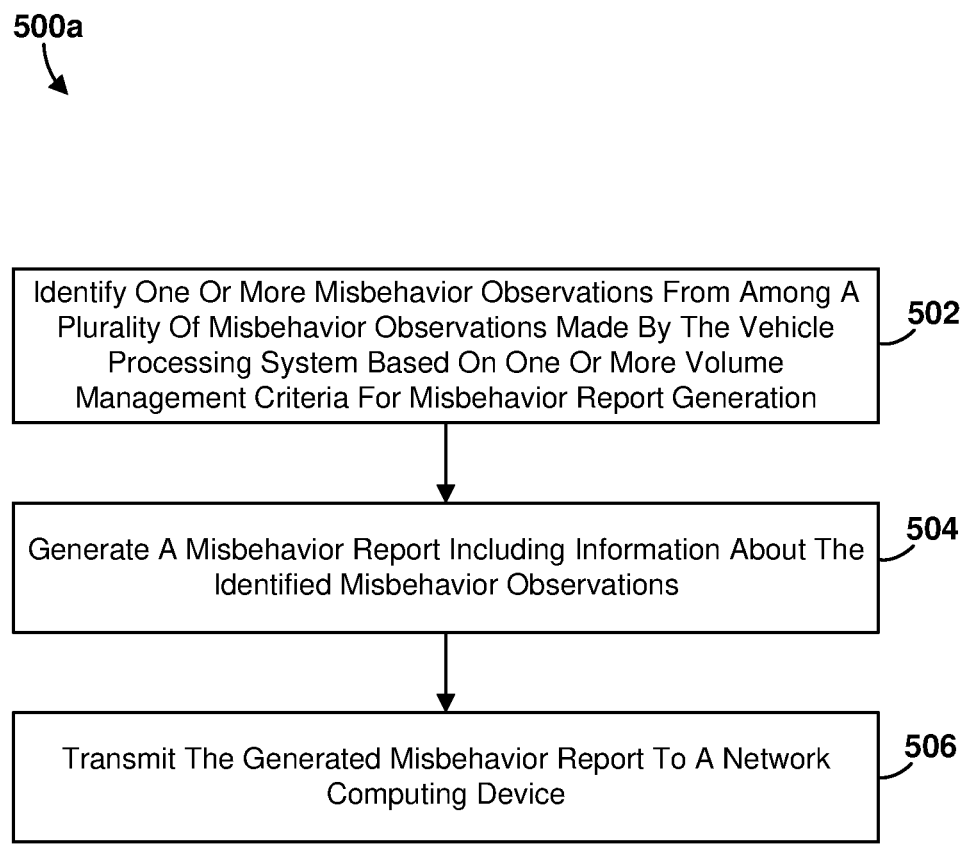
FIG. 5A is a process flow diagram of an example method performed by a processor of vehicle processing system for managing a volume of misbehavior reports in accordance with various embodiments.

FIG. 5A is a process flow diagram of an example method 500a performed by a processor of vehicle processing system for managing the volume of misbehavior reports transmitted by the vehicle in accordance with various embodiments. With reference to FIGS. 1A-5A, the method 500a may be performed by one or more processors (e.g., 205, 300) of a vehicle processing system that may be implemented in hardware elements, software elements, or a combination of hardware and software elements. Means for performing the operations of the method 500a include a vehicle processing system (e.g., 104) that may include one or more processors (e.g., 205, 300) implementing or controlling one or more modules (e.g., 434-440). To encompass any of the processors, hardware elements, and software element that may perform the operations of the method 500a, the element or subsystems performing method operations are referred to generally as a "processor."

In block 502, the processor may identify one or more misbehavior observations from among a plurality of misbehavior observations made by the vehicle processing system based on one or more volume management criteria for misbehavior report generation. In some embodiments, the volume management criteria may include a predefined time window. In some embodiments, the volume management criteria may include a predefined time window and one or more additional selection criteria. In some embodiments, the volume management criteria may include a predefined time window and a criticality weight assigned to each misbehavior observation. In some embodiments, the processor may identify the misbehavior observations from among the plurality of misbehavior observations made by the vehicle processing system based on one or more volume management criteria for misbehavior report generation in response to determining that a quantity of misbehavior observations made by the vehicle processing system meets a threshold quantity of misbehavior observations.

In block 504, the processor may generate a misbehavior report including information about the identified misbehavior observations.

In block 506, the processor may transmit the generated misbehavior report to a network computing device.

FIGS. 5B-5H are process flow diagrams of example operations 500b-500h that may be performed by a processor of a computing device as part of the method 500a for managing a volume of misbehavior reports in accordance with various embodiments. With reference to FIGS. 1A-5H, the operations 500b-500h may be performed by one or more processors (e.g., 205, 300) of a vehicle processing system that may be implemented in hardware elements, software elements, or a combination of hardware and software elements. Means for performing the operations 500b-500h include a vehicle processing system (e.g., 104) that may include one or more processors (e.g., 205, 300) implementing or controlling one or more modules (e.g., 434-440). To encompass any of the processors, hardware elements, and software element that may perform the operations 500b-500h, the element or subsystems performing such operations are referred to generally as a "processor."

Figure 5B:
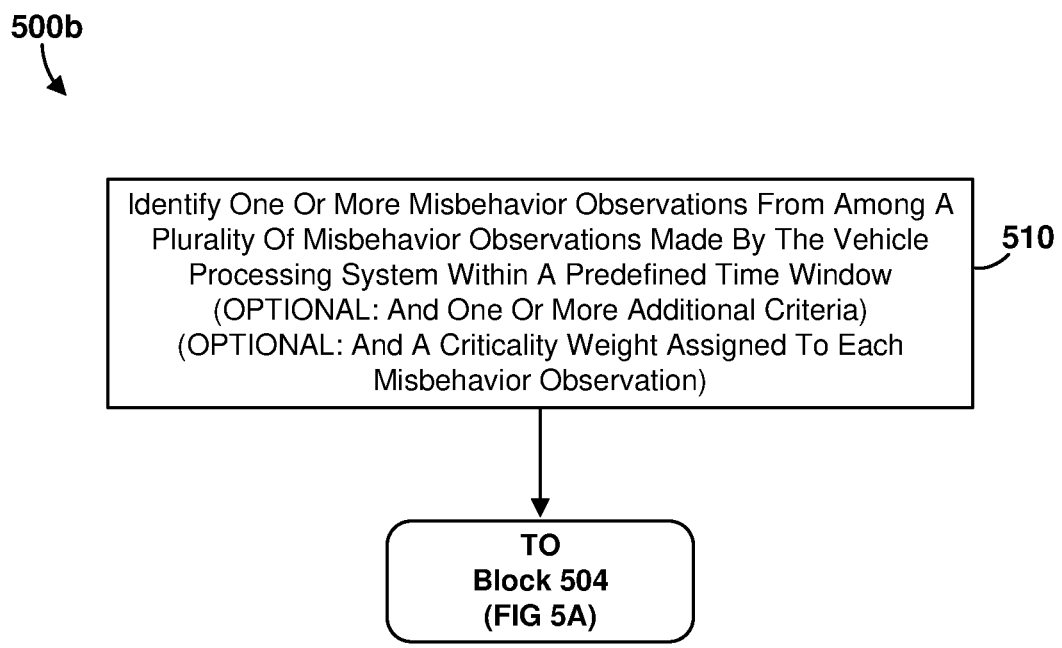
FIGS. 5B-5H are process flow diagrams of example operations that may be performed by a processor of a computing device as part of the method for managing a volume of misbehavior reports in accordance with various embodiments.

Referring to FIG. 5B, in block 510, the processor may identify one or more misbehavior observations from among a plurality of misbehavior observations made by the vehicle processing system within a predefined time window. In some embodiments, the processor may identify one or more misbehavior observations from among a plurality of misbehavior observations made by the vehicle processing system within a predefined time window and based on one or more additional criteria. In some embodiments, the processor may identify one or more misbehavior observations from among a plurality of misbehavior observations made by the vehicle processing system within a predefined time window and based on a criticality weight assigned to each misbehavior observation. In some embodiments, the processor may apply the one or more additional criteria and the criticality weight assigned to each misbehavior observation.

The processor may generate a misbehavior report including information about the identified misbehavior observations in block 504 of the method 500a as described.

Figure 5C:
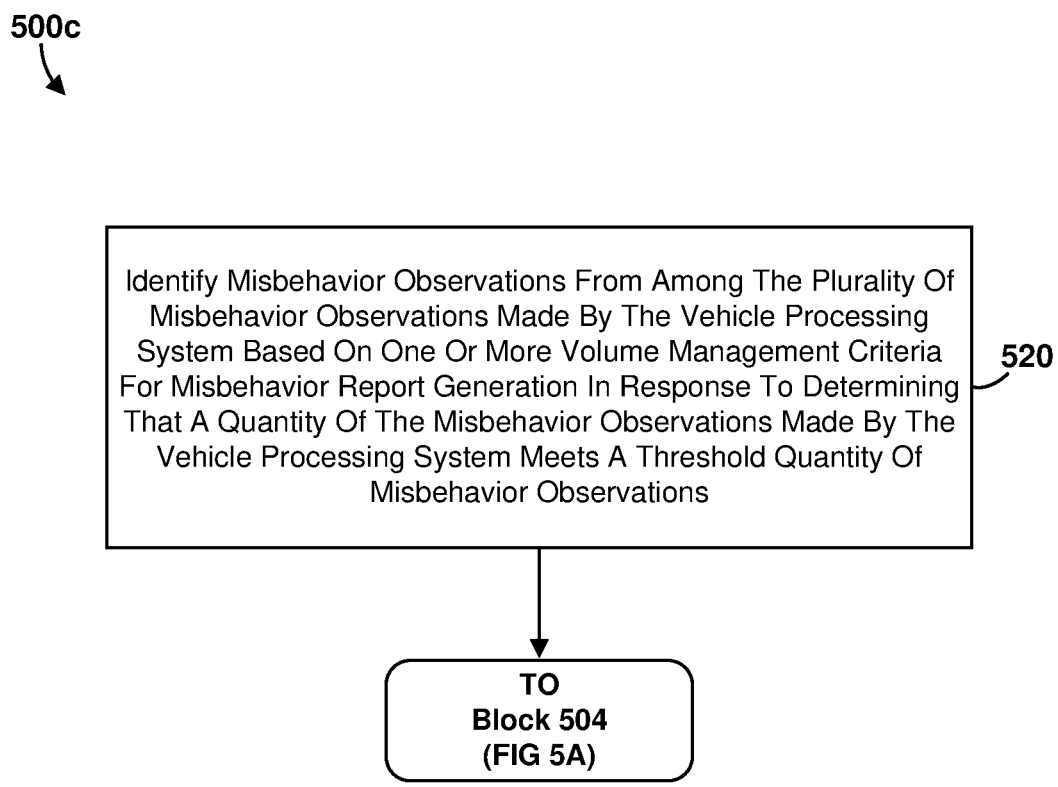

Referring to FIG. 5C, in block 520, the processor may identify misbehavior observations from among the plurality of misbehavior observations made by the vehicle processing system based on one or more volume management criteria for misbehavior report generation in response to determining that a quantity of misbehavior observations made by the vehicle processing system meets a threshold quantity of misbehavior observations.

The processor may generate a misbehavior report including information about the identified misbehavior observations in block 504 of the method 500a as described.

Figure 5D:
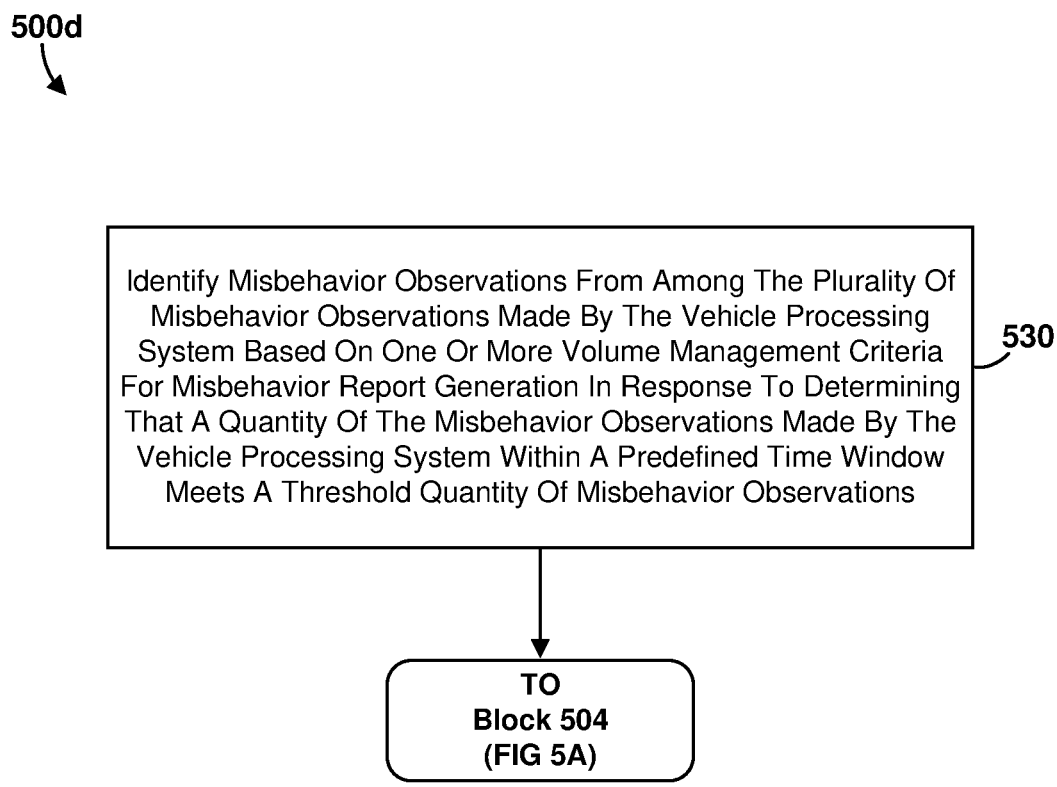

Referring to FIG. 5D, in block 530, the processor may identify misbehavior observations from among the plurality of misbehavior observations made by the vehicle processing system based on one or more volume management criteria for misbehavior report generation in response to determining that a quantity of misbehavior observations made by the vehicle processing system within a predefined time window meets a threshold quantity of misbehavior observations.

The processor may generate a misbehavior report including information about the identified misbehavior observations in block 504 of the method 500a as described.

Figure 5E:
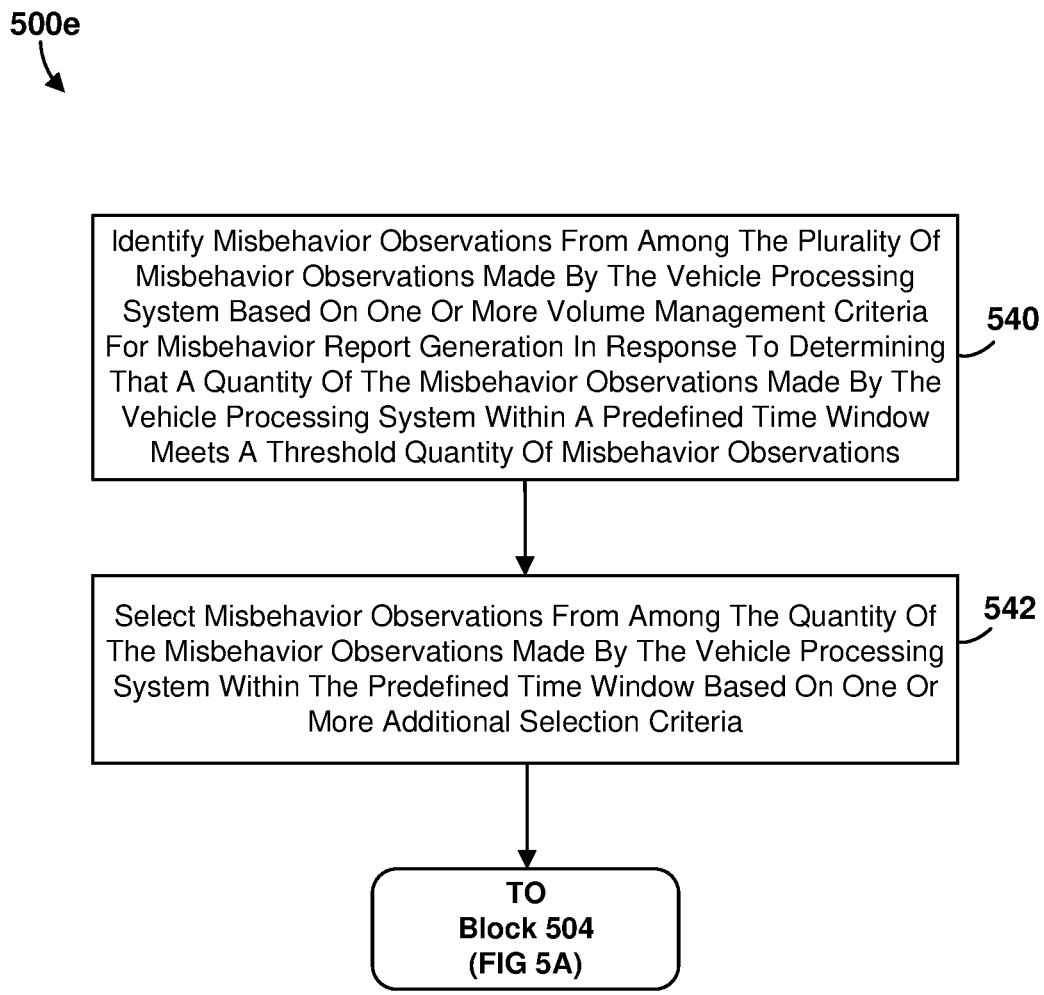

Referring to FIG. 5E, in block 540, the processor may identify misbehavior observations from among the plurality of misbehavior observations made by the vehicle processing system based on one or more volume management criteria for misbehavior report generation in response to determining that a quantity of misbehavior observations made by the vehicle processing system within a predefined time window meets a threshold quantity of misbehavior observations.

In block 542, the processor may select misbehavior observations from among the quantity of misbehavior observations made by the vehicle processing system within the predefined time window based on one or more additional selection criteria.

The processor may generate a misbehavior report including information about the identified (and selected) misbehavior observations in block 504 of the method 500a as described.

Figure 5F:
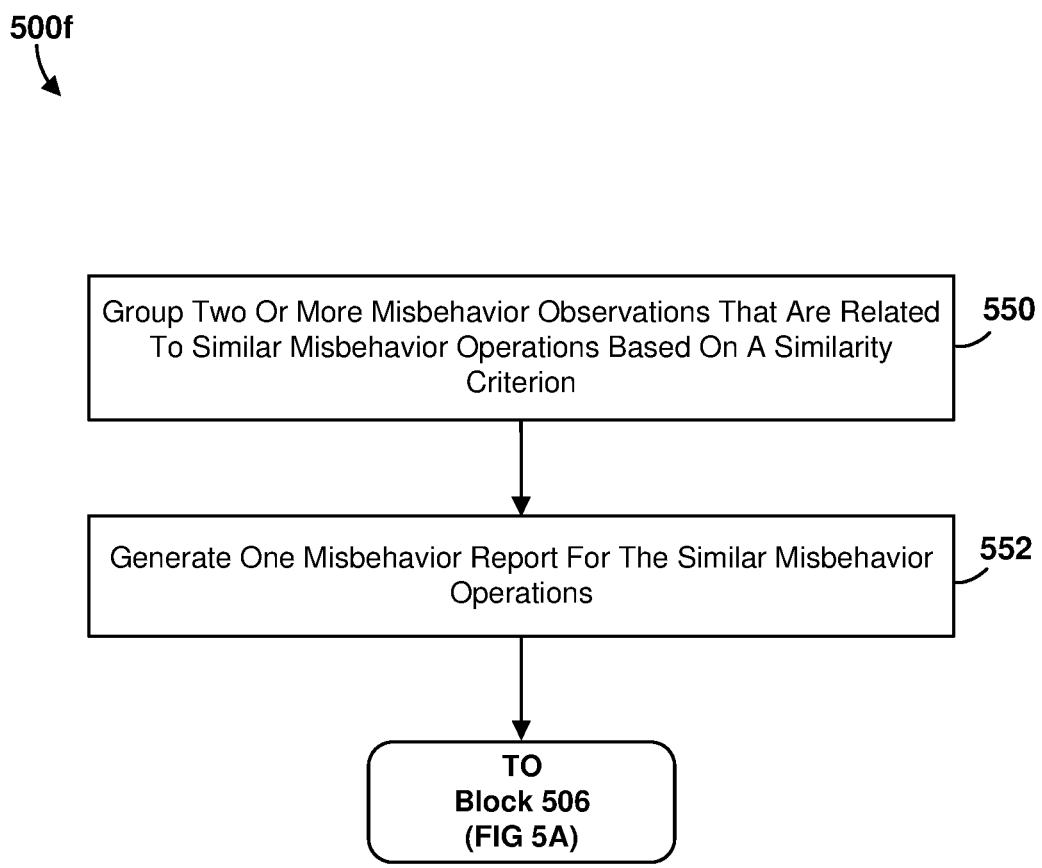

Referring to FIG. 5F, in block 550, the processor may group two or more misbehavior observations that are related to similar misbehavior operations based on a similarity criterion (or two more similarity criteria). For example, the processor may assign a value or values to each misbehavior observation based on a characterization (or characterizations) of the misbehavior observation. In some embodiments, the processor may characterize a misbehavior observation according to one or more of type of misbehavior, location misbehavior, type of vehicle associated with the observed misbehavior, identifier of the vehicle associated with the observed misbehavior, and/or another suitable characterization. In some embodiments, the processor may determine that one or more values based on one or more characterizations of observed misbehaviors are within a similarity threshold.

In block 552, the processor may generate one misbehavior report for the similar misbehavior operations.

The processor may transmit the generated misbehavior report to a network computing device in block 506 of the method 500a as described.

Figure 5G:
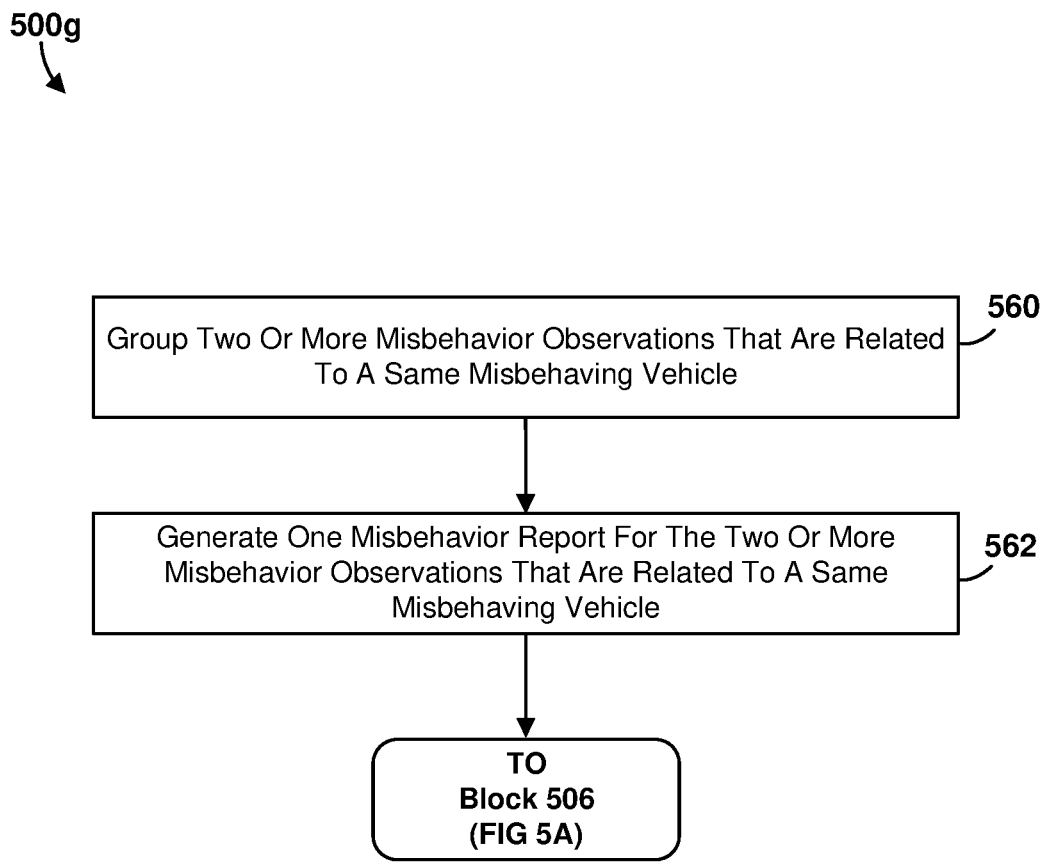

Referring to FIG. 5G, in block 560, the processor may group two or more misbehavior observations that are related to a same misbehaving vehicle. In some embodiments, the processor may identify the misbehaving vehicle according to an identifier of the vehicle, a type of the vehicle, a location of the vehicle, and/or another suitable factor or information.

In block 562, the processor may generate one misbehavior report for the two or more misbehavior observations that are related to a same misbehaving vehicle.

The processor may transmit the generated misbehavior report to a network computing device in block 506 of the method 500a as described.

Figure 5H:
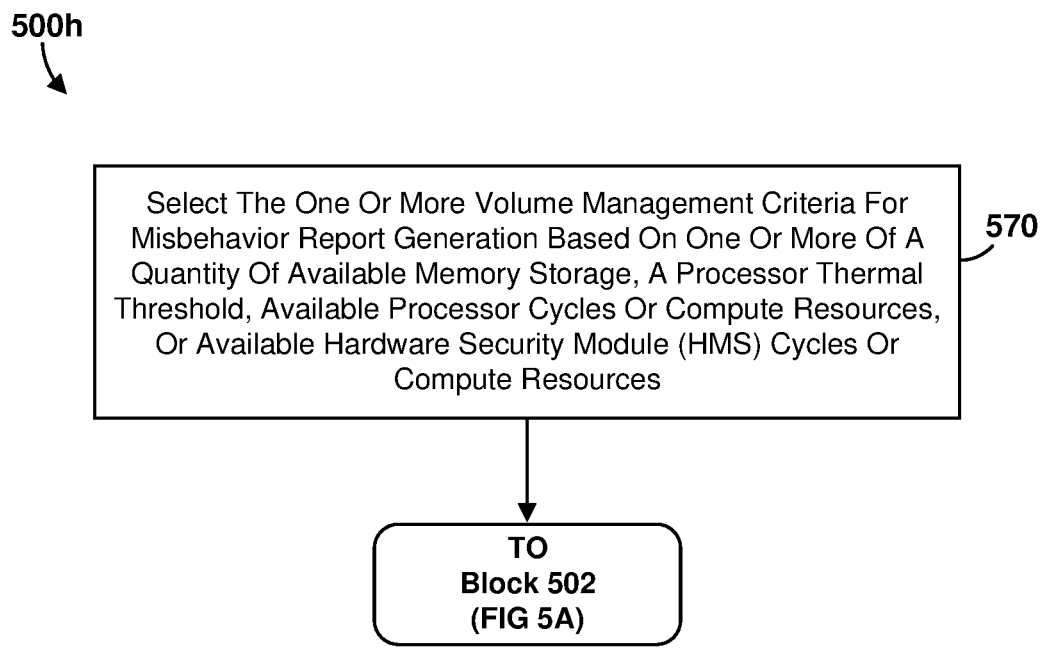

Referring to FIG. 5H, in block 570, the processor may select the one or more volume management criteria for misbehavior report generation based on one or more of a quantity of available memory storage, a processor thermal threshold, available processor cycles or compute resources, or available hardware security module (HSM) cycles or compute resources.

The processor may identify one or more misbehavior observations from among a plurality of misbehavior observations made by the vehicle processing system based on the one or more volume management criteria for misbehavior report generation in block 502 of the method 500a as described.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods and operations 500a-500h may be substituted for or combined with one or more operations of the methods or operations 500a-500h.

Implementation examples are described in the following paragraphs. While some of the following implementation examples are described in terms of example methods, further example implementations may include: the example methods discussed in the following paragraphs implemented by a computing device including a processor configured with processor-executable instructions to perform operations of the methods of the following implementation examples; the example methods discussed in the following paragraphs implemented by a computing device including means for performing functions of the methods of the following implementation examples; and the example methods discussed in the following paragraphs may be implemented as a non-transitory processor-readable storage medium having stored thereon processor-executable instructions configured to cause a processor of a computing device to perform the operations of the methods of the following implementation examples.

Example 1. A method performed by a vehicle processing system for managing a volume of misbehavior reports, including: identifying one or more misbehavior observations from among a plurality of misbehavior observations made by the vehicle processing system based on one or more volume management criteria for misbehavior report generation; generating a misbehavior report including information about the identified misbehavior observations; and transmitting the generated misbehavior report to a network computing device.

Example 2. The method of example 1, in which the volume management criteria includes a predefined time window.

Example 3. The method of example 1, in which the volume management criteria includes a predefined time window and one or more additional selection criteria.

Example 4. The method of example 1, in which the volume management criteria includes a predefined time window and a criticality weight assigned to each misbehavior observation.

Example 5. The method of any of examples 1-4, in which identifying one or more misbehavior observations from among the plurality of misbehavior observations made by the vehicle processing system based on one or more volume management criteria for misbehavior report generation is performed in response to determining that a quantity of misbehavior observations made by the vehicle processing system meets a threshold quantity of misbehavior observations.

Example 6. The method of any of examples 1-4, in which identifying one or more misbehavior observations from among the plurality of misbehavior observations made by the vehicle processing system based on one or more volume management criteria for misbehavior report generation includes identifying one or more misbehavior observations from among the plurality of misbehavior observations made by the vehicle processing system based on one or more volume management criteria for misbehavior report generation in response to determining that a quantity of the misbehavior observations made by the vehicle processing system within a predefined time window meets a threshold quantity of misbehavior observations.

Example 7. The method of any of examples 1-4, in which identifying one or more misbehavior observations from among the plurality of misbehavior observations made by the vehicle processing system based on one or more volume management criteria for misbehavior report generation includes: identifying one or more misbehavior observations from among the plurality of misbehavior observations made by the vehicle processing system based on one or more volume management criteria for misbehavior report generation in response to determining that a quantity of the misbehavior observations made by the vehicle processing system within a predefined time window meets a threshold quantity of misbehavior observations; and selecting misbehavior observations from among the quantity of the misbehavior observations made by the vehicle processing system within the predefined time window based on one or more additional selection criteria.

Example 8. The method of any of examples 1-4, in which: identifying one or more misbehavior observations from among the plurality of misbehavior observations made by the vehicle processing system based on one or more volume management criteria for misbehavior report generation includes grouping two or more misbehavior observations that are related to similar misbehavior operations based on a similarity criterion; and generating the misbehavior report including information about the identified misbehavior observations includes generating one misbehavior report for the similar misbehavior operations.

Example 9. The method of any of examples 1-4, in which: identifying one or more misbehavior observations from among the plurality of misbehavior observations made by the vehicle processing system based on one or more volume management criteria for misbehavior report generation includes grouping two or more misbehavior observations that are related to a same misbehaving vehicle; and generating the misbehavior report including information about the identified misbehavior observations includes generating one misbehavior report for the two or more misbehavior observations that are related to a same misbehaving vehicle.

Example 10. The method of any of examples 1-9, further including selecting the one or more volume management criteria for misbehavior report generation based on one or more of a quantity of available memory storage, a processor thermal threshold, available processor cycles or compute resources, or available hardware security module (HSM) cycles or compute resources.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a vehicle processing system for managing a volume of misbehavior reports, comprising:
   receiving one or more volume management criteria associated with a resource constraint;
   identifying a first subset of one or more misbehavior observations from among a plurality of misbehavior observations made by the vehicle processing system based on the received one or more volume management criteria for misbehavior report generation;
   selecting a second subset of the first subset of the one or more misbehavior observations based on one or more selection criteria;
   generating a misbehavior report including information about the second subset of the one or more misbehavior observations; and
   transmitting the generated misbehavior report to a network computing device.

2. The method of claim 1, wherein the received one or more volume management criteria comprises a predefined time window.

3. The method of claim 1, wherein the received one or more volume management criteria comprises a predefined time window and one or more one or more of first in-first out (FIFO), last-in-first out (LIFO), a threshold quantity of misbehavior observations, and a similarity threshold.

4. The method of claim 1, wherein the received one or more volume management criteria comprises a predefined time window and a criticality weight assigned to each misbehavior observation.

5. The method of claim 1, wherein identifying the first subset of one or more misbehavior observations from among the plurality of misbehavior observations made by the vehicle processing system based on one or more volume management criteria for misbehavior report generation is performed in response to determining that a quantity of misbehavior observations made by the vehicle processing system meets a threshold quantity of misbehavior observations.

6. The method of claim 1, wherein identifying the first subset of one or more misbehavior observations from among the plurality of misbehavior observations made by the vehicle processing system based on one or more volume management criteria for misbehavior report generation comprises identifying the first subset of one or more misbehavior observations from among the plurality of misbehavior observations made by the vehicle processing system based on one or more volume management criteria for misbehavior report generation in response to determining that a quantity of misbehavior observations made by the vehicle processing system within a predefined time window meets a threshold quantity of misbehavior observations.

7. The method of claim 1, wherein:
   identifying the first subset of one or more misbehavior observations from among the plurality of misbehavior observations made by the vehicle processing system based on one or more volume management criteria for misbehavior report generation comprises: identifying the first subset of one or more misbehavior observations from among the plurality of misbehavior observations made by the vehicle processing system based on one or more volume management criteria for misbehavior report generation in response to determining that a quantity of misbehavior observations made by the vehicle processing system within a predefined time window meets a threshold quantity of misbehavior observations; and selecting a second subset of the first subset of the one or more misbehavior observations based on one or more selection criteria by:
  selecting the second subset of the one or more misbehavior observations from among the quantity of misbehavior observations made by the vehicle processing system within the predefined time window based on the one or more selection criteria.

8. The method of claim 1, wherein:
identifying one or more misbehavior observations from among the plurality of misbehavior observations made by the vehicle processing system based on one or more volume management criteria for misbehavior report generation comprises grouping two or more misbehavior observations that are related to similar misbehavior operations based on a similarity criterion; and
generating the misbehavior report including information about the identified misbehavior observations comprises generating one misbehavior report for the similar misbehavior operations.

9. The method of claim 1, wherein:
identifying one or more misbehavior observations from among the plurality of misbehavior observations made by the vehicle processing system based on one or more volume management criteria for misbehavior report generation comprises grouping two or more misbehavior observations that are related to a same misbehaving vehicle; and
generating the misbehavior report including information about the identified misbehavior observations comprises generating one misbehavior report for the two or more misbehavior observations that are related to a same misbehaving vehicle.

10. The method of claim 1, wherein the one or more volume management criteria for misbehavior report generation are based on one or more of:
a quantity of available memory storage, a processor thermal threshold, available processor cycles or compute resources, or available hardware security module (HSM) cycles or compute resources.

11. A vehicle processing system, comprising:
a memory; and
one or more processors coupled the memory and configured to:
  receive one or more volume management criteria associated with a resource constraint
  identify a first subset of one or more misbehavior observations from among a plurality of misbehavior observations made by the vehicle processing system based on the one or more volume management criteria for misbehavior report generation;
  select a second subset of the first subset of the one or more misbehavior observations based on one or more selection criteria;
  generate a misbehavior report including information about the second subset of the one or more misbehavior observations; and
  transmit the generated misbehavior report to a network computing device.

12. The vehicle processing system of claim 11, wherein the received one or more volume management criteria comprises a predefined time window.

13. The vehicle processing system of claim 11, wherein the received one or more volume management criteria comprises a predefined time window, first in-first out (FIFO), last-in-first out (LIFO), a threshold quantity of misbehavior observations, and a similarity threshold.

14. The vehicle processing system of claim 11, wherein the received one or more volume management criteria comprises a predefined time window and a criticality weight assigned to each misbehavior observation.

15. The vehicle processing system of claim 11, wherein the one or more processors are further configured to identify the first subset of the misbehavior observations from among the plurality of misbehavior observations made by the vehicle processing system in response to determining that a quantity of misbehavior observations made by the vehicle processing system meets a threshold quantity of misbehavior observations.

16. The vehicle processing system of claim 11, wherein the one or more processors are further configured to identify the first subset of the misbehavior observations from among the plurality of misbehavior observations made by the vehicle processing system in response to determining that a quantity of misbehavior observations made by the vehicle processing system within a predefined time window meets a threshold quantity of misbehavior observations.

17. The vehicle processing system of claim 11, wherein:
the one or more processors are further configured to identify the first subset of the misbehavior observations from among the plurality of misbehavior observations made by the vehicle processing system based on one or more volume management criteria for misbehavior report generation by: identifying the first subset of the one or more misbehavior observations from among the plurality of misbehavior observations made by the vehicle processing system based on one or more volume management criteria for misbehavior report generation in response to determining that a quantity of misbehavior observations made by the vehicle processing system within a predefined time window meets a threshold quantity of misbehavior observations; and
the one or more processors are further configured to select a second subset of the first subset of the one or more misbehavior observations based on one or more selection criteria by:
  selecting misbehavior observations from among the quantity of misbehavior observations made by the vehicle processing system within the predefined time window based on the one or more selection criteria.

18. The vehicle processing system of claim 11, wherein the one or more processors are further configured to:
identify misbehavior observations from among the plurality of misbehavior observations made by the vehicle processing system based on one or more volume management criteria for misbehavior report generation by grouping two or more misbehavior observations that are related to similar misbehavior operations based on a similarity criterion; and
generate the misbehavior report including information about the identified misbehavior observations by generating one misbehavior report for the similar misbehavior operations.

19. The vehicle processing system of claim 11, wherein the one or more processors are further configured to:

identify misbehavior observations from among the plurality of misbehavior observations made by the vehicle processing system based on one or more volume management criteria for misbehavior report generation by grouping two or more misbehavior observations that are related to a same misbehaving vehicle; and generate the misbehavior report including information about the identified misbehavior observations by generating one misbehavior report for the two or more misbehavior observations that are related to a same misbehaving vehicle.

20. The vehicle processing system of claim 11, wherein the one or more volume management criteria for misbehavior report generation are based on one or more of a quantity of available memory storage, a processor thermal threshold, available processor cycles or compute resources, or available hardware security module (HSM) cycles or compute resources.

21. A vehicle processing system, comprising:
means for receiving one or more volume management criteria associated with a resource constraint;
means for identifying a first subset of one or more misbehavior observations from among a plurality of misbehavior observations made by the vehicle processing system based on the one or more volume management criteria for misbehavior report generation;
means for selecting a second subset of the first subset of the one or more misbehavior observations based on one or more selection criteria;
means for generating a misbehavior report including information about the second subset of the one or more misbehavior observations; and
means for transmitting the generated misbehavior report to a network computing device.

22. The vehicle processing system of claim 21, wherein the received one or more volume management criteria comprises a predefined time window.

23. The vehicle processing system of claim 21, wherein the received one or more volume management criteria comprises a predefined time window and a criticality weight assigned to each misbehavior observation.

24. The vehicle processing system of claim 21, wherein means for identifying the first subset of the one or more misbehavior observations from among the plurality of misbehavior observations made by the vehicle processing system based on one or more volume management criteria for misbehavior report generation comprises means for identifying the first subset of the one or more misbehavior observations in response to determining that a quantity of misbehavior observations made by the vehicle processing system meets a threshold quantity of misbehavior observations.

25. The vehicle processing system of claim 21, wherein means for identifying the first subset of the one or more misbehavior observations from among the plurality of misbehavior observations made by the vehicle processing system based on one or more volume management criteria for misbehavior report generation comprises means for identifying the first subset of the one or more misbehavior observations from among the plurality of misbehavior observations made by the vehicle processing system in response to determining that a quantity of misbehavior observations made by the vehicle processing system within a predefined time window meets a threshold quantity of misbehavior observations.

26. The vehicle processing system of claim 21, wherein:
means for identifying the first subset of the one or more misbehavior observations from among the plurality of misbehavior observations made by the vehicle processing system based on one or more volume management criteria for misbehavior report generation comprises:
means for identifying the first subset of the one or more misbehavior observations from among the plurality of misbehavior observations made by the vehicle processing system based on one or more volume management criteria for misbehavior report generation in response to determining that a quantity of misbehavior observations made by the vehicle processing system within a predefined time window meets a threshold quantity of misbehavior observations; and
means for selecting a second subset of the first subset of the one or more misbehavior observations based on one or more selection criteria comprises:
means for selecting the second subset of the one or more misbehavior observations from among the quantity of misbehavior observations made by the vehicle processing system within the predefined time window based on one or more selection criteria.

27. The vehicle processing system of claim 21, wherein:
means for identifying one or more misbehavior observations from among the plurality of misbehavior observations made by the vehicle processing system based on one or more volume management criteria for misbehavior report generation comprises means for grouping two or more misbehavior observations that are related to similar misbehavior operations based on a similarity criterion; and
means for generating the misbehavior report including information about the identified misbehavior observations comprises means for generating one misbehavior report for the similar misbehavior operations.

28. The vehicle processing system of claim 21, wherein:
means for identifying one or more misbehavior observations from among the plurality of misbehavior observations made by the vehicle processing system based on one or more volume management criteria for misbehavior report generation comprises means for grouping two or more misbehavior observations that are related to a same misbehaving vehicle; and
means for generating the misbehavior report including information about the identified misbehavior observations comprises means for generating one misbehavior report for the two or more misbehavior observations that are related to a same misbehaving vehicle.

29. The vehicle processing system of claim 21, wherein the one or more volume management criteria for misbehavior report generation are based on one or more of a quantity of available memory storage, a processor thermal threshold, available processor cycles or compute resources, or available hardware security module (HSM) cycles or compute resources.

30. A non-transitory, processor-readable medium having stored thereon processor-executable instructions configured to cause a vehicle processing system to perform operations comprising:
receiving one or more volume management criteria associated with a resource constraint;
identifying a first subset of one or more misbehavior observations from among a plurality of misbehavior observations made by the vehicle processing system based on the one or more volume management criteria for misbehavior report generation;

selecting a second subset of the first subset of the one or more misbehavior observations based on one or more selection criteria;

generating a misbehavior report including information about the second subset of the one or more misbehavior observations; and transmitting the generated misbehavior report to a network computing device.

* * * * *